United States Patent [19]

Marsoner et al.

[11] 4,369,951
[45] Jan. 25, 1983

[54] SQUEEZED TUBE VALVE

[75] Inventors: Hermann Marsoner, Graz; Erich Kleinhappl, Kumberg, both of Austria

[73] Assignee: Hans List, Graz, Austria

[21] Appl. No.: 290,213

[22] Filed: Aug. 5, 1981

[30] Foreign Application Priority Data

Aug. 11, 1980 [AT] Austria ............................. 4119/80

[51] Int. Cl.³ .............................................. F16L 55/14
[52] U.S. Cl. ........................................................ 251/7
[58] Field of Search ........................ 251/7, 8, 129, 141

[56] References Cited

U.S. PATENT DOCUMENTS

| 2,674,435 | 4/1954 | Angell | 251/7 |
| 3,264,067 | 8/1966 | Alderfer | 251/7 |
| 3,419,008 | 12/1968 | Plishner | 251/7 |
| 3,426,539 | 2/1969 | Whear | 251/7 |
| 3,511,469 | 5/1970 | Bell | 251/7 |
| 4,285,492 | 8/1981 | Bujan | 251/7 |

FOREIGN PATENT DOCUMENTS 596483  3/1978  Switzerland ............................ 251/7

Primary Examiner—H. Jay Spiegel
Attorney, Agent, or Firm—Watson, Cole, Grindle & Watson

[57] ABSTRACT

In a squeezed tube valve which comprises a valve block with a longitudinal groove to guide a flexible tube and a transverse groove for an electromagnetically actuated clamping bolt to shut off the tube, the crossing between the longitudinal and the transverse groove is rounded off at its edges, and the clamping force exerted by the bolt rises from zero according to an asymptotic rise function over the duration of the shutting action.

3 Claims, 6 Drawing Figures

SQUEEZED TUBE VALVE

BACKGROUND OF THE INVENTION

The present invention relates to a squeezed tube valve comprising a valve block, in which a flexible tube is guided lengthwise, and a transverse clamping bolt which can be electromagnetically actuated to shut off the flexible tube. The valve block is provided with a longitudinal groove of an essentially U-shaped cross-section running in the direction of the tube axis, and with a transverse groove for the clamping bolt of approximately the same depth as the longitudinal groove.

Squeezed tube valves are widely used, as their use eliminates the need of sealing the shutting element proper, or rather its actuating mechanism, against the environment or, in the case of aggresive flowing media or media with very high purity requirements, against these media. In equipment for analytical purposes above all, such valves are frequently used for the control of liquids and gases conveyed in flexible tubes where they either shut or open a particular test path embodied by the tube.

DESCRIPTION OF THE PRIOR ART

In a known variety of squeezed tube valves the tube to be shut is squeezed against a flat surface and is thus closed by means of a mostly round clamping bolt which is positioned across the tube and is actuated by an electromagnet. These known types of valves suffer from the disadvantage that normal to its axis the tube is not fastened in place in the area of the transverse clamping bolt and it may therefore easily slip out of this area due to movements during the squeezing action, thus rendering the shutting mechanism inoperative.

In order to avoid this lateral movement of the tube, squeezed tube valves of the above type have been designed such that the tube is guided in a longitudinal groove, e.g., on a circular valve block, while another groove crossing this longitudinal groove is provided for the clamping bolt. Although this design will prevent the tube from slipping out at the sides while being squeezed by the bolt, the deformation of the tube during each squeeze in the area of the crossing of the two grooves will result in damage to the tube due to the edges of the crossing grooves, after a few hundred actuation cycles, leading to leakage cuts within a very short time. Although the edges usually are slightly rounded in the crossing area of the grooves, they still make excessive demands on the elasticity of the tube in this small squeeze zone as they largely prevent the squeezed section of the tube from moving into the adjacent areas of the two grooves, especially in conjunction with the sudden shutting force exerted by the electromagnet.

SUMMARY OF THE INVENTION

It is an object of the present invention to find a simple way of improving a squeezed tube valve of the above-mentioned type such that the mechanical demands on the tube will be reduced and the tube will thus endure a practically unlimited number of actuation cycles without showing any major wear.

According to the present invention this is achieved by rounding off the edges of the crossing between the longitudinal and the transverse groove in such a way that the radii of the rounded-off portions correspond approximately to the tube radius, and by actuating the clamping bolt in such a way that the shutting force it exerts on the tube rises from zero according to an asymptotic rise function over the duration of the shutting action. The rounded edges between the longitudinal and the transverse groove, together with the shutting force applied according to an asymptotic rise function will enable the tube during the shutting process, i.e., while it is being squeezed, to yield in the immediate squeeze zone at the crossing between the two grooves by expanding on both sides into the grooves, at least to the extent that the elastic deformation of the tube material is spread over a larger area and thus precludes an inadmissible strain on this particular region. Thus any crosswise slippage of the tube is eliminated while ensuring that no damaging of the tube will occur which might lead to downtime.

Basically, it would be possible to extend the width of the longitudinal groove in the squeeze zone at the crossing of the transverse groove, thereby giving the tube enough space for further expansion. Surprisingly enough, however, another variant of the invention has proved to be superior, wherein at the rounded-off edges bordering on the transverse groove the width of the longitudinal groove-as compared to the outer diameter of the tube, is increased only slightly (preferably amounting to not more than 110% of the tube diameter), and that, starting from there, the walls of the longitudinal groove widen linearly towards both ends of the valve block. As has been shown in various tests, squeezed tube valves of this particular design will permit several million actuation cycles without any damage to the squeezed tube hampering their proper functioning.

According to another embodiment of this invention, the life of the tube can be further prolonged by reducing the holding force exerted on the tube by the clamping bolt on termination of the shutting movement by one third or even one half of the maximum shutting force applied during the shutting movement. After the shutting force rising according to an asymptotic function has reached the maximum value required for shutting the tube quickly, the load on the electromagnetically actuated clamping bolt is reduced to such an extent that only the holding force required for sealing the tube will remain. This will not only avoid unnecessary squeezing of the tube for a considerable length of time, but will also help to reduce the consumption of electric power needed for actuating the clamping bolt quite drastically, which will make the whole device even more economical.

DESCRIPTION OF THE DRAWING

Following is a more detailed description of different types of squeezed tube valves as illustrated by the enclosed drawing, wherein.

DESCRIPTION OF THE PREFERRED EMBODIMENTS

Figure 1:
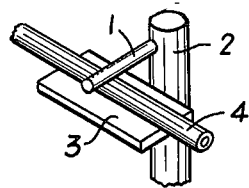
FIGS. 1 and 2 show squeezed tube valves designed according to the prior state of the art.

The known type of squeezed tube valve as represented in FIG. 1 is provided with a clamping bolt 1 which can be pressed against a supporting surface 3 by means of an electromagnet (not shown) in the direction of the axis 2 such that a flexible tube 4 can be shut off in the area of the clamping bolt 1. Due to the absence of any lateral guidance of the tube 4 on the supporting surface 3, the squeezed tube can give way on both sides when the shutting force is applied via the clamping bolt 1 moving downwards in the direction of the axis 2, but this very possibility of unrestricted lateral movement may also result in the tube 4 slipping sideways from beneath the clamping bolt 1 during a rapid succession of shutting and opening cycles, which means that the tube can no longer be shut off.

Figure 2:
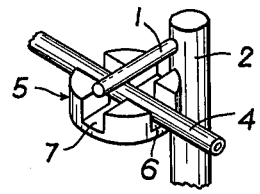

In the known variant of a squeezed tube valve shown in FIG. 2, the tube 4 is prevented from slipping sideways by providing instead of a smooth supporting surface a disk-shaped valve block 5 for the tube, which is provided with a longitudinal groove 6 of a predominantly U-shaped cross-section in the direction of the axis of the tube 4. In addition to the longitudinal groove 6 serving for lateral guidance of the tube 4, the valve block 5 is provided with a transverse groove 7, which is located in the area of the clamping bolt 1 (which again may be pressed against the tube 4 in the direction of the axis 2) and which has approximately the same depth as the longitudinal groove 6. Although this design will prevent any lateral slipping of the tube 4 from beneath the clamping bolt 1, the configuration of the crossing area between the longitudinal groove 6 and the transverse groove 7 will lead to a heavy strain on the tube 4 in this area, which will result in premature damage to the tube 4—mainly due to the sudden application of force by a shutting magnet (not shown here) which goes along with this type of design—since the squeezed tube is not allowed to give way in the area of the crossing of the two grooves.

Figure 3:
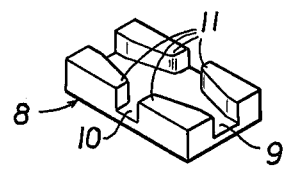
FIGS. 3 and 4 are concerned with variants of the present invention.

The valve block 8 of a squeezed tube valve designed according to the present invention, which is represented in FIG. 3, also is provided with a longitudinal groove 9 and a transverse groove 10, both of which serve for the same purposes as grooves 6 and 7 discussed with respect to FIG. 2 with regard to guiding and squeezing of the tube. The crossing area between the longitudinal groove 9 and the transverse groove 10, however, is provided with rounded-off edges 11 of a radius approximately the same as that of the tube, which—in conjunction with the time curve shown in FIG. 5 of the shutting force P applied via the clamping bolt (not shown)—will enable the tube (also not shown) extending in the longitudinal groove 9 to give way on both sides in the squeeze zone, thus spreading over a larger area the deformation of the flexible tube during the squeezing action of the clamping bolt, and eliminating the risk of damaging the tube.

Figure 5:
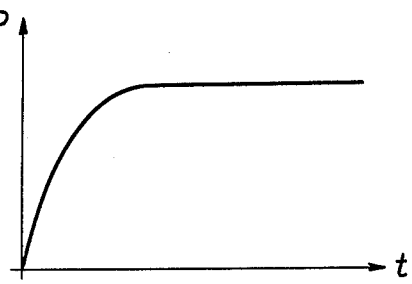
FIGS. 5 and 6 contain force/time diagrams of the shutting force acting upon the clamping bolt.

According to FIG. 5 the shutting force P acting upon the clamping bolt will rise from zero at a time t corresponding to the beginning of the shutting movement of the clamping bolt according to an asymptotic rise function during the shutting movement, and will then remain constant until the electromagnet is turned off, i.e., until the valve opens again, which is not shown in FIG. 5.

Figure 4:
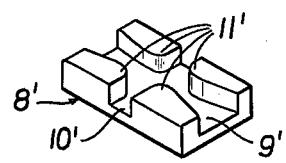

Experience has shown that the squeezed tube valve designed according to the present invention, whose positive effects on the life of the tube have been discussed with respect to FIGS. 3 and 5, will protect the tube even better if, e.g., the valve block 8' is designed as shown in FIG. 4.

In this case the longitudinal groove 9' is only slightly wider than the outer diameter of the tube (not shown) in the area of the rounded-off edges 11' leading to the transverse groove 10', the width preferably amounting to 110% of the outer tube diameter, and is provided with side-walls which widen linearly and lead from the crossing area to both ends of the valve block 8'. Due to this design of the longitudinal groove 9', both sides of the tube are held in place in the area of the clamping bolt, while permitting the squeezed part of the tube to give way into the transverse groove and, towards the ends of the valve block, into the longitudinal groove itself.

Figure 6:
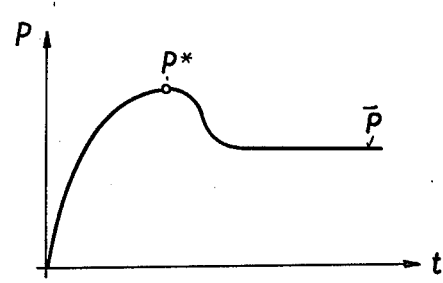

FIG. 6 is concerned with another way of applying the shutting force P according to this invention. As with FIG. 5, the shutting force P will rise according to an asymptotic rise function until the maximum shutting force P* has been reached which is necessary for a quick shutting of the squeezed tube valve, but will subsequently dropping smoothly to a holding level $\overline{P}$. The drop of the squeezing force exerted on the tube by the clamping bolt by approximately one third to one half of the maximum shutting force applied during the shutting movement, which will take place on completion of the shutting movement, will preserve the tube even better and will drastically cut down the power consumption of the electromagnet needed for actuating the clamping bolt.

A squeezed tube valve designed as specified by the invention will be gentle on the elastic tube material during operation of the valve and will thus permit the tube to withstand several million actuation cycles, especially if configured as shown in FIGS. 4 and 6.

I claim:

1. A squeezed tube valve comprising, an electromagnetically actuated clamping bolt and a valve block, said valve block having a longitudinally extending groove of essentially U-shaped cross-section for the reception of a flexible tube therein along said groove, said valve block also having a transversely extending groove of approximately the same depth as said longitudinal groove for the reception upon actuation of said clamping bolt which lies transverse to said longitudinal groove, said longitudinally extending groove and said transversely extending groove each being defined by a bottom portion and two side walls, said grooves intersecting and presenting edges which are rounded off, the location of intersection of said grooves defining a squeeze zone, said edges bounding said squeeze zone and being defined by the intersection of said side walls of the respective longitudinally extending and transversely extending grooves, said edges having radii corresponding at least approximately with the tube radius, and said clamping bolt being actuated for shutting off the tube by squeezing in such a manner that the shutting force exerted by the bolt on the tube rises from zero according to an asymptotic rise function over the duration of the shutting action, whereby the tube during the shutting process is permitted to yield in said squeeze zone by expanding on opposite sides into both said grooves thus avoiding undue strain on the tube at said zone.

2. The valve according to claim 1, wherein said longitudinal groove has an increased width at said edges relative to the tube, and said longitudinal groove having opposed side walls which diverge from said edges toward opposite ends of said block.

3. A squeezed tube valve according to claim 2, wherein said increased width of said longitudinal groove is no greater than 110 percent of the outer diameter of the tube.

* * * * *